Sept. 21, 1971   W. S. EGGERT, JR   3,606,626
MOTOR CONTROL ELECTRICAL SYSTEM
Filed Dec. 30, 1969   2 Sheets-Sheet 1
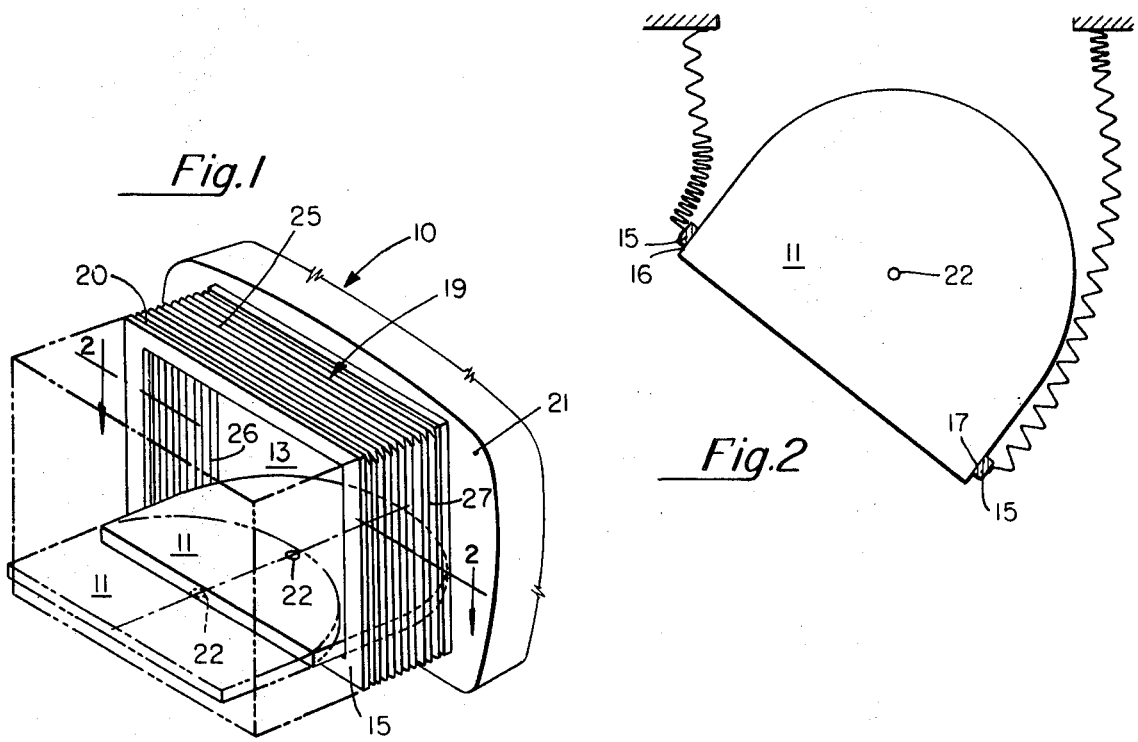
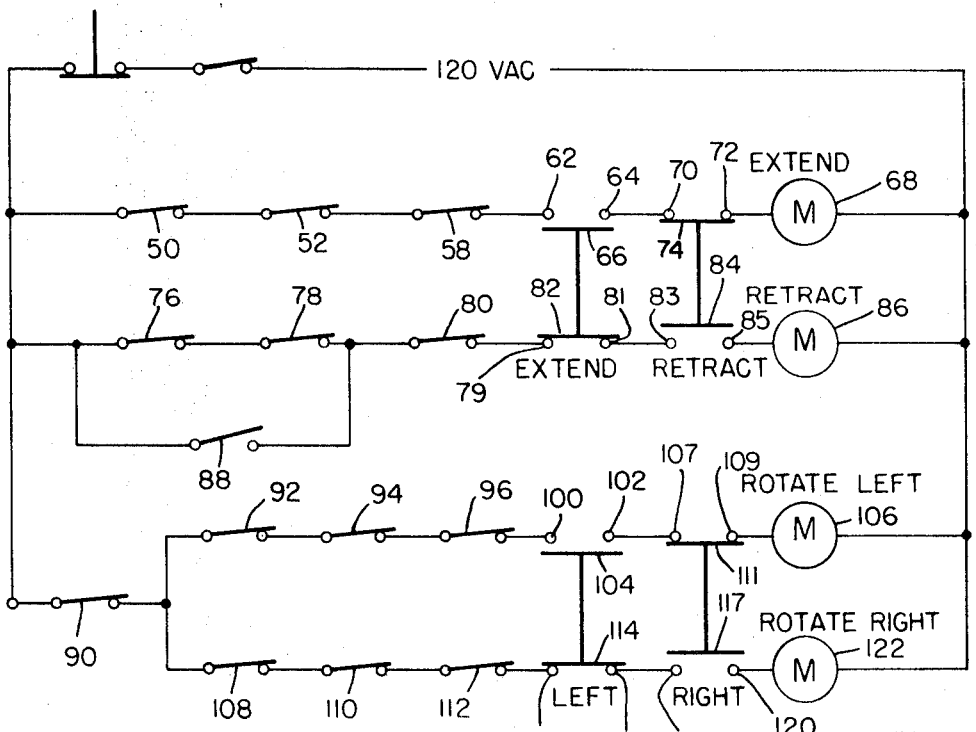
INVENTOR.
WALTER S. EGGERT, JR.
BY
Edward M. Farrell
ATTORNEY Sept. 21, 1971   W. S. EGGERT, JR   3,606,626
MOTOR CONTROL ELECTRICAL SYSTEM
Filed Dec. 30, 1969   2 Sheets-Sheet 2

INVENTOR.
WALTER S. EGGERT, JR.
BY
*Edward M. Farrell*
ATTORNEY

United States Patent Office 3,606,626
Patented Sept. 21, 1971

3,606,626
MOTOR CONTROL ELECTRICAL SYSTEM
Walter S. Eggert, Jr., Huntingdon Valley, Pa., assignor to Boothe Airside Services, Inc.
Filed Dec. 30, 1969, Ser. No. 889,109
Int. Cl. B65g 11/00
U.S. Cl. 14—71                                        5 Claims

ABSTRACT OF THE DISCLOSURE

An electrical system is provided to limit the degree of expandable and rotatable movement of a passenger ramp of a vehicle adapted to provide a walkway from the vehicle to a terminal. Proper alignment of the ramp is assured during expansion and retraction operations.

---

This invention relates to a type of vehicle adapted to carry passengers from a terminal to an airplane. The vehicle includes a pod for carrying passengers which is adapted to be moved up and down. The pod is moved to the level of the floor in a terminal building or to the level of a floor in a plane to permit people to walk from the vehicle to the terminal or plane.

In order to provide a walkway between the vehicle and the terminal or plane, an expandable walkway or gangway may be provided. To assure alignment of the walkway with the terminal or plane, the gangway may be rotated over predetermined angles. The type of vehicle with which the subject invention may be employed is described in a co-pending application to J. M. Herring, Jr., entitled "Aircraft Transfer Vehicle," Ser. No. 762,443, filed Sept. 25, 1968 and assigned to the same assignee as the present invention. Also, the general type of walkway or gangway which may be employed with the present invention is described in a co-pending application of Eggert entitled "Bellows Construction," Ser. No. 850,142, filed Aug. 14, 1969, and assigned to the same assignee as the present invention.

In expanding and rotating the walkway involved in a vehicle of the type described in the aforementioned patents, certain precautions are necessary. For example, the vehicle generally approaches the terminal at some slight angle. This necessitates the ramp being extended and rotated to attain proper alignment. When the ramp is extended, in most cases one side of the ramp will contact the terminal or plane before the other. At this point, it is necessary to stop extending the ramp and perform a rotational operation. Also, when the ramp is retracted and is in a slightly rotated position, means must be employed to assure that the ramp is centered and not partly rotated before it is fully retracted.

It is an object of this invention to provide a novel circuit for controlling the expansion, retraction and rotation of a ramp adapted to provide a walkway from a vehicle to a terminal.

It is still a further object of this invention to provide protective means for limiting the expansion of a walkway when one of the sides of the walkway contacts a terminal.

It is still a further object of this invention to provide improved means to assure proper alignment of the ramp while it is being retracted.

In accordance with the present invention, a vehicle includes an extendable and rotatable ramp adapted to engage a terminal or aircraft to provide a walkway for a passanger between the vehicle and the terminal or aircraft. Motor means are provided for extending and retracting the ramp. When the ramp is extended, motor means enable rotation of the free end of the ramp over predetermined angles. Switching means are responsive to the position of the ramp to limit the expansion and degrees of rotational movement of the ramp. The switching means limits the extendable movement of the ramp when one side of the ramp contacts the terminal or plane while permitting rotational movement of the ramp only in a direction so as to move the one side of the ramp away from the terminal. Also, the switching means prevents full retraction of the ramp when it is partly rotated.

Other objects and advantages of the present invention will be apparent and suggest themselves to those skilled in the art, from a reading of the following specification and claims, in conjunction with the accompanying drawing, in which:

FIG. 1 illustrates a movable ramp adapted to be part of a vehicle, in accordance with the present invention;

FIG. 2 is a view taken along lines 2—2 of FIG. 1 illustrating the degrees of rotational movement of the ramp;

FIG. 4 is a schematic diagram of the switching circuitry, in accordance with the present invention.

Figure 3:
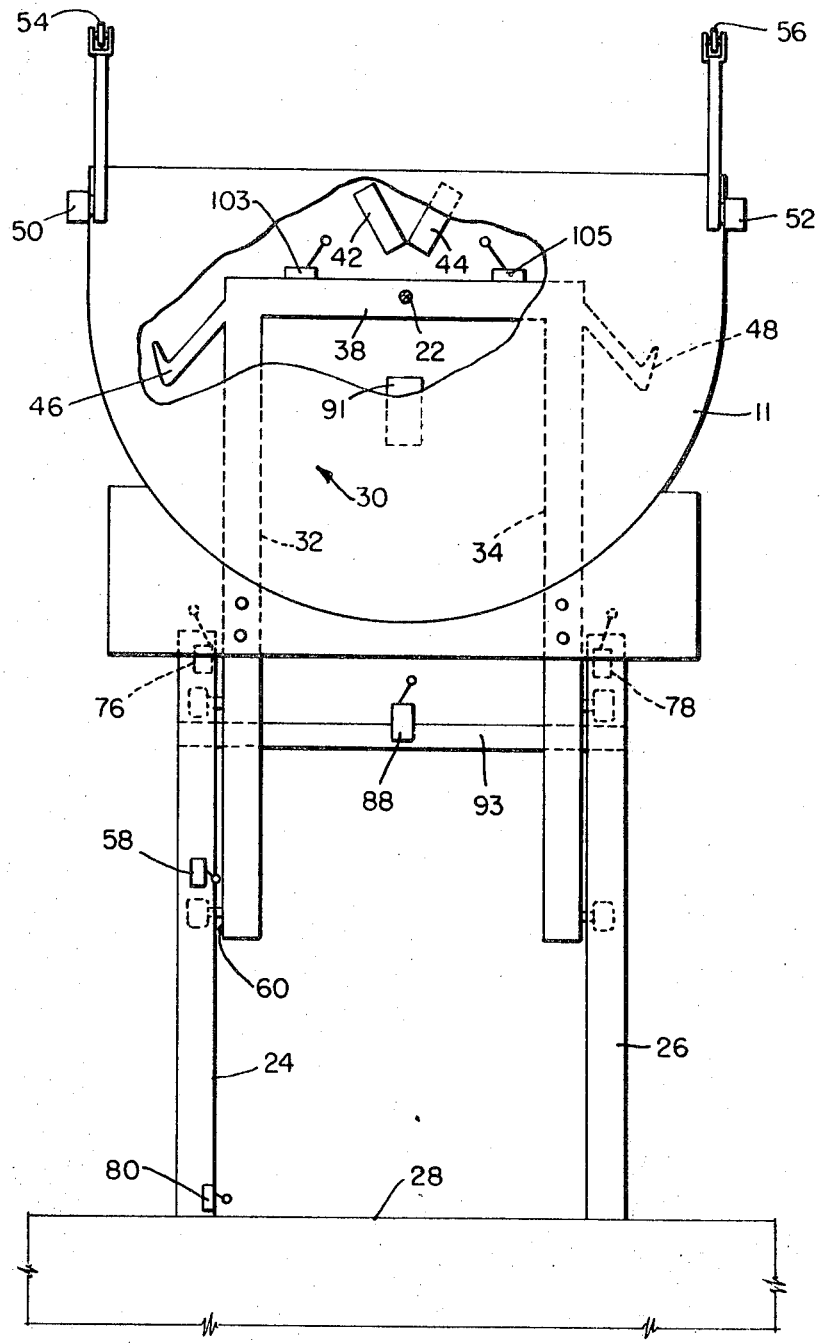
FIG. 3 is a diagrammatical representation of the mechanical arrangement and position of the various switches involved in the switching circuitry, in accordance with the present invention.

Referring particularly to FIGS. 1 and 2, a front portion 10 of an aircraft passenger transfer vehicle includes a rotatable walkway or gangway 11 which may be extended and retarcted relative to an access opening or doorway 13 in the vehicle. A rectangular frame 15 encircles the front portion of the walkway platform and is suitably affixed to its side surfaces 16 and 17. A bellows construction 19 encircles the walkway to constitute a tunnel construction therearound to provide protection for the passengers as they walk from the vehicle. The forward end of the bellows is affixed to the rear face 20 of the frame 15 while the rear end portion of the bellows is affixed to the front face 21 of the vehicle by fastening means not illustrated.

By extending the walkway 11 to its phantom line position illustrated in FIG. 1, the bellows 19 supported by the frame 15 is stretched accordingly. In addition, the walkway may be suitably rotated about a vertical axis as indicated at 22 in FIG. 2 to thereby stretch one side portion of the bellows to a greater amount than the opposite side.

FIGS. 1 and 2 and features relating to the bellows arrangement are disclosed in the aforementioned co-pending application of Eggert entitled "Bellows Construction." The present invention, however, is particularly directed toward the electrical circuitry for controlling the expansion, retraction and rotation of the walkway or gangway.

Referring to FIGS. 3 and 4, the main mechanical supporting elements for the gangway 11 includes a pair of supporting rails 24 and 26 attached to the main bolster 28 of the vehicle. A supporting structure 30 includes a pair of rail members 32 and 34 adapted to ride within the rail support members 24 and 26 by means of rollers or other means not illustrated. The members 32 and 34 are interconnected at the end by a member 38. A plate member 30 is secured to the rail members 32 and 34 by means of bolting or other means. The end support member 38 includes a pair of angularly disposed structural members 42 and 44.

The turntable 11 is supported on the various structural elements 32, 34, 38, 42 and 44 and is adapted to be pivoted about the point 22. Various motor means (not illustrated) are used to expand and rotate the ramp 11 at appropriate times. A pair of cam elements 46 and 48 are mounted on the rails 32 and 34, respectively, to engage microswitches during a retraction operation, as will be described.

A plurality of switches are associated wtih the various structures illustrated to provide protective features and to limit the various degrees of movement of the ramp 11.

These switches are illustrated in the approximate positions illustrated, it being understood that actually their physical positions may be elsewhere. The cooperative relationship between the switches will be described in connection with FIG. 4.

Referring to FIG. 4, along with FIG 3, a pair of microswitches 50 and 52 are disposed toward the front of the ramp 11 and are normally closed. A pair of feeler members 54 and 56, which may be pivoted roller elements, are spring-loaded and adapted to engage the side of a plane or terminal when the vehicle is moved adjacent thereto and the ramp 11 is extended. A limit switch 58 is normally closed and adapted to be opened by a cam member 60 on the support member when the ramp 11 is in a fully extended position.

When an operator closes contacts 62 and 64 by a push-button contact 66, power is applied from the power source, designated as 120 v.a.c. to a motor 68 to cause the ramp 11 to be extended. It is noted that when the ramp 11 is fully extended, the switch 58 will be open and further movement of the ramp is not possible. Likewise, if either one of the switches 50 or 52 is opened as a result of contact with the plane or terminal, it will be impossible to further extend the ramp 11. It is noted that the contacts 70 and 72 are normally closed by a push-button contact 74. It is therefore seen that the switches 50 and 52 provide a protective means to prevent the ramp 11 from moving forward whenever contact is made by either side of the ramp 11.

Power is also applied through a reraction circuit which includes switches 76, 78 and 80, as well as the push-button contact switch elements 82 and 84. The push-button arm 82 closes contact 79 and 81 while the push-button contact 84 closes contact 83 and 85. A normally opened switch 88 is connected across the normally closed switches 76 and 78.

When an operator in a vehicle pushes the contact arm 84 to close the contact 83 and 85, power will be applied to the motor 86 unless one of the switches 76, 78 or 80 is open. The switch 80 is adapted to be opened when the ramp 11 is fully retracted at which point the support element 32 opens the switch 60 at the extreme retracted position.

The purpose of the switchs 76, 78 and 88 is to assure that the ramp 11 is aligned before it is fully retracted. If the ramp 11 is rotated toward the left beyond a predetermined angle, one of the cam members 46 or 48 will actuate the switches 76 or 78. If one of these switches is opened, continued retraction is not possible. For example, if the turntable 11 is rotated too much to the left, the cam element 46 will open the switch 76 disenabling the motor 86. Likewise, if the turntable 11 is rotated too much toward the right, the cam 48 will open the switch 78 to prevent continued retraction of the ramp 11.

In operation as the ramp 11 is retracted and one of the switches 76 or 78 is open, it will be necessary to rotate the ramp 11 in the proper direction so as to permit the switch which has been opened to reclose thereby permitting continued retraction of the ramp 11. It is thus seen that the ramp 11 must be within predetermined angular positions before the ramp can be retracted.

When the ramp 11 is perfectly centered, i.e. not rotated either to the right or to the left, the normally opened switch 88 mounted on a cross beam 90 closes. The switch 88 now permits continued retraction of the ramp 11 regardless of the condition of the switches 76 and 78. Consequently, it is seen that for the initial retraction operation, the switches 76 and 78 will control the retraction operation. When the ramp 11 is extended beyond a certain point, it is still possible to retract the ramp 11 until some predetermined distance is reached. This permits the operator to extend or retract the ramp while it is in a rotated position. Once the ramp 11 is retracted inwardly beyond a certain point, the closing of the switch 88 then assures correct alignment of the ramp 11 thereby permitting it to become fully retracted at which point the switch 80 opens. The switches 76, 78 and 88 may be regarded as a gating circuit with the switches 76 and 78 controlling the retraction operation until a predetermined point is reached at which time the switch 88 controls the retraction with rotation not being possible.

Another section of the switching network includes a path to permit left or right rotation of the ramp 11. A switch 90 is common to both of these paths and is normally closed. The switch 90 is associated with the switch 88 so that opposite operating conditions are attained. When the switch 88 is open, the switch 90 is closed and, vice versa, when the switch 88 is closed, the switch 90 is open.

Switches 92, 94 and 96 are normally closed. Contacts 100 nad 102 are normally open but adapted to be closed by an operator pushing a push-button contact 104. When the push-button 104 is closed with all the other switches being closed, power may be applied to the motor 106 to permit the turntable 11 to be rotated to the left or in a counterclockwise direction.

The right rotation circuit includes the switch 90, a normally closed switch 108, a normally closed switch 110 and a normally closed switch 112. A push-button contact 114 normally closes a pair of contacts 113 and 115. A movable contact arm 117 is adapted to close contacts 118 and 120. When the switches 108, 110 and 112 are closed along with the movable arms 114 and 117, a motor 122 is actuated to permit the turntable 11 to be rotated to the right or in a clockwise direction.

It is noted that when the switch 88 is closed, this will indicate that the ramp 11 is within a predetermined distance of the vehicle. At this point, the switch 90 will be opened. Because of the closeness of the ramp to the vehicle, it is impossible to rotate the ramp 11 either clockwise or counterclockwise.

Switches 50 and 108 are connected together so that they both open and close simultaneously. Thus when the switch 50 is open indicating contact with a building or aircraft, the switch 108 is open thereby preventing any right rotational movement. In like manner, the switches 52 and 92 are connected to open together in the same manner, i.e. they are both closed or both open. Thus when the switch 52 is open, it indicates a physical contact with a terminal building or aircraft. Further left rotational movement is prevented by the open switch 108.

It is thus seen that the circuit described provides a protective feature which prevents the rotation of the ramp 11 when it is within a predetermined short distance of the vehicle.

The overall electrical system described provides protective features for the operation of the ramp 11. The first feature prevents the ramp from being further extended whenever one side of the ramp physically contacts a terminal or plane. The second feature assures that the ramp is properly centered before it is fully retracted. A third feature prevents rotation of the ramp once it is within a predetermined distance of the vehicle.

It is noted that when one of the switches 50 or 52 physically contacts a plane or terminal, that the extension movement of the ramp is discontinued. However, the ramp 11 may be rotated in a direction so as to remove the open switch away from the plane or termnial. It is impossible to rotate the ramp 11 in the wrong direction so as to further push the side of the ramp into the airplane. Thus by a process of extending the ramp and the rotating it, an operator is able to align the front of the ramp accurately with respect to the plane or terminal.

What is claimed is:

1. In an extendable and rotatable ramp adapted to physically contact a terminal to provide a walkway between a vehicle and said terminal, first motor means operatively related to said ramp and walkway for extending and retracting said ramp, second motor means operatively related to said ramp and walkway for rotating the free end of said ramp over predetermined angles, first switching means operatively connected to said first motor means and responsive to either activate said first motor means when said ramp is away from said terminal or to inactivate said first motor means when said ramp engages said terminal, second switch means operatively connected to said second motor means and responsive to the rotational position of said ramp to control the operation of said second motor means to limit the rotational movement of said ramp, said first and second switching means being connected to each other to limit the extendable movement of said ramp when one side of said ramp contacts said terminal and to permit rotational movement of said ramp only in the direction to move said one side of said ramp away from said terminal.

2. The invention as set forth in claim 1 wherein third switching means is connected to said first motor means to limit the retraction of said ramp when said ramp is rotated beyond predetermined angles in either direction.

3. The invention as set forth in claim 2 wherein fourth switching means is connected to said second motor means to prevent rotation of said ramp when said ramp is disposed within a predetermined distance of said vehicle.

4. The invention as set forth in claim 3 wherein limit switches are connected to said first motor means to limit the extension and retraction of said ramp.

5. The invention as set forth in claim 4 wherein said third switching means comprises three switching elements, the first of said switching elements limiting the reaction of said ramp when it is rotated beyond a predetermined angular limit in a first direction, the second of said switching elements limiting the retraction of said ramp when it is rotated beyond a certain predetermined angular limit in the opposite direction, and the third of said switching elements becoming operative to permit continued retraction of said ramp when both said first and second switching elements are activated, said third switching element connect across said first and second switching elements.

References Cited

UNITED STATES PATENTS

| | | | |
|---|---|---|---|
| 2,846,703 | 8/1958 | Adley | 14—71 |
| 2,881,457 | 4/1959 | Rodgers | 14—71 |
| 3,046,908 | 7/1962 | Der Yen | 104—20 |
| 3,310,823 | 3/1967 | Preiss | 14—71 |
| 3,369,264 | 2/1968 | Kurka | 14—71 |
| 3,462,784 | 8/1969 | Seipos | 14—71 |

NILE C. BYERS, JR., Primary Examiner